UNITED STATES PATENT OFFICE.

CHARLES LESLIE BONSTEEL, OF MOOSE JAW, SASKATCHEWAN, CANADA.

ALUMINIUM-SOLDER FLUX.

1,312,154.     Specification of Letters Patent.     Patented Aug. 5, 1919.

No Drawing.     Application filed January 11, 1919. Serial No. 270,733.

*To all whom it may concern:*

Be it known that I, CHARLES LESLIE BONSTEEL, a subject of the King of Great Britain, and resident of the city of Moose Jaw, Province of Saskatchewan, in the Dominion of Canada, have invented certain new and useful Improvements in Aluminium-Solder Flux, described in the following specification.

The object of the present invention is to produce a flux for use in conjunction with a suitable aluminium solder which will effect a thorough union between the solder and the members to which the solder is united.

The invention consists essentially in the novel admixture of ingredients in or about the proportions named.

The mixture of ingredients which I have found gives the most satisfactory results in effecting a union of aluminium solder with aluminium articles comprises the following ingredients in or about the proportions named: aluminium chlorid, 265 parts; zinc chlorid, 320 parts; borax, 2 parts; paraffin wax, 67 parts; beef tallow, 25 parts; sulfur, 25 parts.

These ingredients are all placed together and heated till thoroughly melted and when cooled form a soft paste which is spread over the surface of the material to be soldered. The paraffin wax forms a binder to unite the aluminium and zinc chlorids and the borax and sulfur and the beef tallow is preferably used as a softener to prevent crystallization and hardening of the flux. The beef tallow may possibly be substituted by other forms of grease but the tallow produces the best results in the final use of the flux as it does not discolor or gum up the work, whereas it is found that substitutes for the beef tallow produce a dirty finish and do not make as uniform a flux.

The flux as herein described effects a thorough and tenacious union between the aluminium solder and the surface of the aluminium parts.

What I claim as my invention is:—

1. An aluminium solder flux, comprising, aluminium chlorid, zinc chlorid, borax, sulful, a suitable binding material, and a suitable non-hardening material.

2. An aluminium solder flux, consisting of an admixture in or about the following proportions, aluminium chlorid, 265 parts, zinc, 320 parts, borax, 2 parts, sulfur, 25 parts, paraffin wax, 67 parts, and a softening material, 25 parts.

3. An aluminium solder flux, consisting of an admixture in or about the following proportions, aluminium chlorid, 265 parts, zinc chlorid, 320 parts, borax, 2 parts, sulfur, 25 parts, paraffin wax, 67 parts, beef tallow, 25 parts.

CHARLES LESLIE BONSTEEL.